United States Patent

Suozzo

[15] 3,637,173
[45] Jan. 25, 1972

[54] SPRING-TYPE MECHANICAL SHOCK AND SWAY ARRESTOR

[72] Inventor: Leonard S. Suozzo, 366 Maple Hill Drive, Hackensack, N.J. 07601

[22] Filed: Oct. 9, 1970

[21] Appl. No.: 79,559

[52] U.S. Cl. .............................................248/54 CS, 248/60
[51] Int. Cl. .........................................................F16l 3/20
[58] Field of Search..........................248/54 CS, 54 R, 58, 60

[56] References Cited

UNITED STATES PATENTS

| | | | |
|---|---|---|---|
| 2,480,864 | 9/1949 | Loepsinger | 248/54 CS |
| 2,939,663 | 6/1960 | Suozzo | 248/54 CS |
| 3,118,643 | 1/1964 | Suozzo | 248/54 CS |

*Primary Examiner*—Chancellor E. Harris
*Attorney*—F. J. Pisarra

[57] ABSTRACT

A device for use with equipment, such as piping, that is subject to changes in position due to variations in its thermal condition. The device includes a housing that is anchored to a stationary structure, a spring unit positioned within and engaging the housing, a rod extending through and engageable with the spring unit, a lever pivotally connected at spaced locations to the housing and to the rod, coupling mans pivotally connecting the lever to the piping, and camming means including a first cam member affixed to the lever and a second cam member interposed between the first cam member and the spring unit and coupled to the lever by a linkage. The parts are so constructed and arranged that the device permits normal movement of the piping due to said variations in thermal condition. In the event the piping is subjected to an objectionable sudden force, such as a seismic force of predetermined magnitude, the device automatically operates as an arrestor whereby to effectively restrain the piping against movement relative to the stationary structure.

10 Claims, 1 Drawing Figure

PATENTED JAN 25 1972
3,637,173
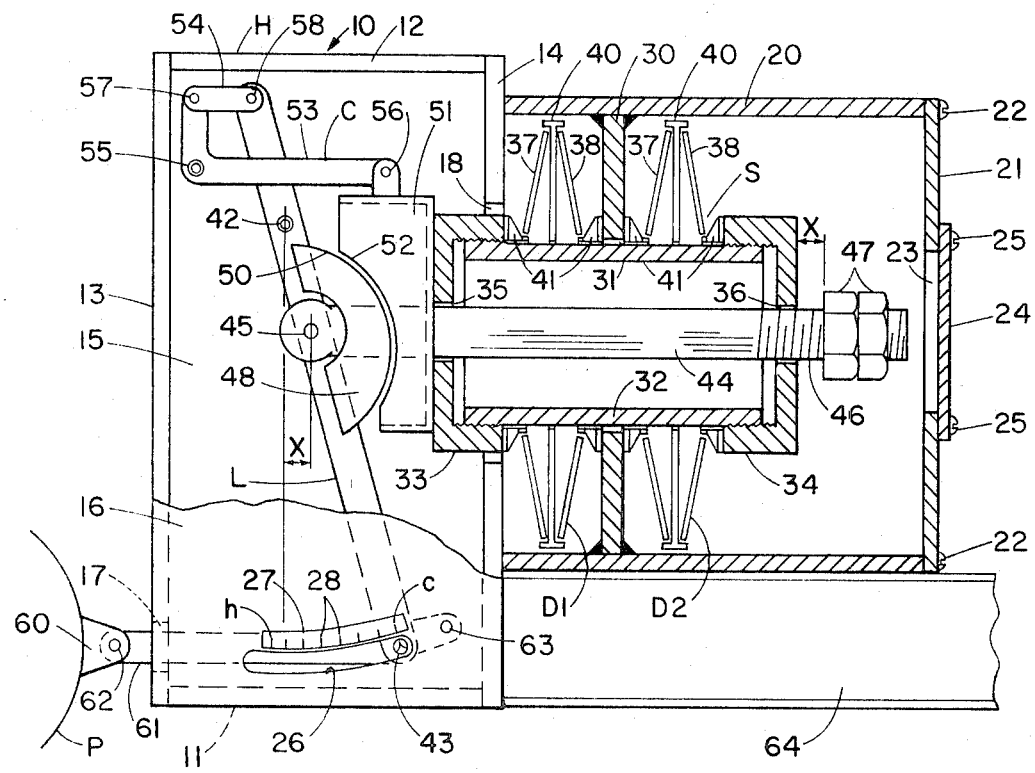
INVENTOR.
LEONARD S. SUOZZO
BY
F. J. Pisarra
Attorney

SPRING-TYPE MECHANICAL SHOCK AND SWAY ARRESTOR

BACKGROUND OF THE INVENTION

This invention relates to the art of shock and sway arrestors and, more particularly, to a completely mechanical device for protecting piping or equipment which may be subjected to shock loading, swaying, vibratory movement or other similar undesirable conditions during normal use.

The shock and sway arrestor of this invention (hereinafter also referred to by the shortened designation "arrestor") constitutes, in effect, a structural device which is so constructed and arranged as to accommodate normal thermal movement of piping or equipment. To this end, the arrestor permits the piping or equipment to move freely and unrestrictedly through its normal operating range. However, and in the event the piping or equipment is subjected to a sudden shock or other displacement force of predetermined magnitude, the arrestor becomes a substantially rigid strut or snubber and transfers such force to a stationary structure, such as a building, at the instant the shock force occurs.

The arrestor of this invention has numerous uses including, without limitation: arresting movement of piping or equipment against undesirable sway and vibration forces, such as those caused by earthquakes; preventing possible damage to outdoor equipment installations due to wind conditions; and protecting piping systems from damage from shock loadings, such as those created by quick closing valves, water hammer, relief valve reaction or other possible causes.

There have been a number of developments in recent years in the field of shock and sway arrestors. Such arrestors include a category employing a hydraulic unit and intended for use with piping of the character indicated. While hydraulic arrestors represent advances in the art and are satisfactory for use in open and readily accessible locales, they are not acceptable for use in locations that are difficult or virtually impossible of access after installation. The reason for this is that the hydraulic unit, due to unavoidable leakage of its hydraulic fluid, requires periodic replenishment of such fluid.

The device of this invention is free of the objections to hydraulic arrestors as it is completely mechanical. Moreover, the present device does not require servicing or maintenance in use, and, for this reason, may be advantageously employed in locations that are normally inaccessible following installation.

SUMMARY OF THE INVENTION

The present arrestor includes support means, preferably a housing, which is adapted to be secured to a stationary structure. Positioned within the housing is a spring unit which is preferably comprised of a plurality of disc springs that are mounted on a coaxial tubular member. A lever is connected to and pivotally movable relative to the housing about a first axis. A rod member extends through the tubular member and is engageable therewith. The rod member is connected to and pivotally movable relative to the lever about a second axis. A coupling means, which is connected to and pivotally movable relative to the lever about a third axis, is adapted to be connected to piping or other equipment. The arrestor also includes camming means comprising a first cam member carried by and movable with the lever about the first axis, a second cam member associated with the first cam member and the tubular member, and connector means joining the second cam member to the lever. The parts are so constructed and arranged that the arrestor allows normal movement of the piping; but, should the piping be subjected to an objectionable sudden force, the arrestor automatically functions as an essentially rigid strut or snubber and restrains the piping against movement relative to the stationary structure.

The principal object of this invention is to provide a spring type mechanical device which permits normal movement of piping or equipment but, in the event the piping or equipment is subjected to a shock or other displacement force of predetermined magnitude, becomes a substantially rigid strut at the instant the shock force occurs.

Another object of the invention is to provide a shock and sway arrestor which may be advantageously employed in locations that are difficult or virtually impossible of access after installation has been completed.

The invention has for a further object the provision of an arrestor of the character indicated that is simple and compact in design; that is sturdy and durable in construction; that is reasonable in manufacturing and installation costs; that does not require servicing or maintenance; and that is capable of rendering efficient and dependable service over extended time periods.

The enumerated objects and additional objects, together with the advantages of the invention, will be readily apparent to persons trained in the art from the following detailed description and the accompanying drawing which respectively describe and illustrate a preferred and recommended embodiment of an arrestor constructed in accordance with this invention.

BRIEF DESCRIPTION OF THE DRAWING

The single FIGURE of the drawing is a side elevation view of an arrestor according to this invention, certain parts being broken away or shown in cross section for better illustration.

DESCRIPTION OF THE PREFERRED EMBODIMENT

As was stated earlier herein, the arrestor of this invention includes a housing which serves as support means for other parts and which is generally denoted by the letter H in the drawing. The housing comprises a rigid rectangular unit 10 consisting of a bottom wall 11, a top wall 12, spaced sidewalls 13 and 14, a rear wall 15 and a removable front wall 16. Sidewalls 13 and 14 are provided with respective openings 17 and 18. Secured to wall 14, preferably by welding, is a tubular body 20 which constitutes part of the housing. The longitudinal opening defined by body 20 is coaxial with opening 18. Body 20 is provided at its free end with a closure plate 21, which is detachably secured thereto by screws 22, and is formed with an opening 23 for permitting access to parts within the body for purposes of adjustment. Plate 21 is equipped with a removable cover 24 that is normally maintained in the illustrated position across opening 23 by screws 25.

Referring back to housing front wall 16, the same is formed with an arcuate slot 26. A scale 27 is positioned along the slot and is provided with a series of graduations 28 for indicating travel of piping or equipment in the course of normal movement from "cold" position to "hot" position, or vice versa. Cold position is denoted on the scale by the letter $c$ while hot position is denoted by the letter $h$.

Extending across the interior of tubular body 20 and securely affixed thereto, preferably by welding, is a partition 30 having a central through opening 31 which is aligned with openings 18 and 23. Partition 30 is cooperatively associated with a spring unit S which will now be described. The spring unit comprises a tubular member 32, which is externally threaded at each end, and a pair of internally threaded cap members 33 and 34 having respective central through openings 35 and 36. As shown, the cap members engage corresponding ends of the tubular member.

Two sets of disc springs D1 and D2 are mounted on and slidable along tubular member 32, set D1 being disposed between partition 30 and cap member 33 and set D2 being disposed between the partition and cap member 34. Each set of disc springs consists of a pair of oppositely facing disc springs 37 and 38, an outer spacing ring 40 and a pair of inner spacing rings 41, all arranged as illustrated. The loading on the sets of disc springs may be readily adjusted to any desired value at the time the arrestor is assembled by turning cap members 33 and 34, as required.

A lever L is located within unit 10 and is pivotal with respect thereto about a first axis 42. The lever is provided at its lower end with a pin type pointer 43 that registers with slot 26 and that is cooperatively associated with scale 27 to indicate the position of equipment, such as piping P, at a particular time. A rod member 44 extends through tubular member 32 and cap openings 35 and 36. One end of the rod member is connected to lever L for pivotal movement about a second axis, as indicated at 45. The other end of the rod member is threaded, as indicated at 46, to receive a pair of lock nuts 47.

The arrestor also includes camming means C which is comprised of a first cam member 48 having a convex arcuate camming face 50 and a second cam member 51 having a concave arcuate face 52. Cam member 48 is carried by and movable with lever L. Cam member 51 is positioned between cam member 48 and cap member 33 with its camming face 52 adjacent and normally slidable relative to camming face 50. The camming means also comprises coupling means connecting cam member 51 to lever L and consisting of a bell lever 53 and a link 54. The bell lever is pivotally connected to housing unit 10 by a pin 55. One end of the bell lever is pivotally connected to cam member 51, as indicated at 56, and at its other end to link 54, as indicated at 57. The link is pivotally connected at 58 to the upper end of lever L. Lever L is adapted to be connected to piping P through the medium of a bracket 60 and a link 61. The bracket is affixed to the piping and is pivotally connected to one end of link 61 as indicated at 62. Pin pointer 43 forms a pivotal connection between the lower end of lever L and the other end of link 61.

At the time the arrestor is assembled, lever L is locked temporarily in its cold position, as indicated, by alignment of pin pointer 43 with graduation c, by means of a removable preset pin 63 which extends through aligned openings in the front and rear walls of unit 10 and in the right end of link 61. This pin is removed at the time of installation. Also at the time of installation, housing H is anchored to a stationary structure 64.

It will be observed from the drawing that cap member 34 of spring unit S is spaced a distance x from adjacent nut 47 when the parts of the arrestor are in cold position. This distance corresponds to the distance that axis 45 shifts to the left in the course of normal movement of piping P and pivotal movement of lever L in the course of travel of the piping from cold position c to hot position h.

For the purpose of describing the operation of the illustrated embodiment of the invention, it is assumed that the arrestor is assembled and installed, as shown in the drawing, with housing H anchored to stationary structure 64 and link 61 connected to piping P. The arrestor is installed with the piping in cold condition. When installation is completed, preset pin 63 is removed, thereby freeing lever L for pivotal movement about axis 42, as required by use conditions. As the temperature of the piping increases, in the course of heating from cold condition to hot condition, the piping, due to expansion, moves toward the left and causes the lever to pivot in a clockwise direction about axis 42 from position c to position h on scale 27. Such movement of the piping shifts axis 45 a distance x which is the same as the distance x between cap member 34 and adjacent nut 47. In other words, the gap, represented by distance x between cap 34 and adjacent nut 47, is gradually reduced to zero in the course of heating the piping from cold to hot position. Also, during such heating, rod 44 merely slides through tubular member 32 and does not exert any force on spring unit S. At the same time, cam member 51 slides downwardly along cap member 33 without affecting operation of the arrestor because of the configuration of its camming face 52 with respect to camming face 50 of cam member 48. It will be observed that normal movement of the piping from cold to hot position is unrestrained by the arrestor. The force exerted by spring units D1 and D2, as the piping moves from cold to hot position, is zero. When the piping is in hot position, rod 44 has been shifted to the left and nut 47 at the left engages cap member 34.

In the event the piping is subjected to a sudden shock or other displacement force tending to move the piping in either direction, the parts of the arrestor are actuated automatically, thereby creating sufficient force in spring unit S to effectively oppose such movement and restrain the piping against further movement.

As was indicated earlier, the spring force of unit S is zero throughout travel of the piping from cold to hot position and may attain a predetermined force at the end of such travel, thus closing the gap represented by distance x and generating two equal forces. While the opposing force created by the spring unit is normally effective in one direction only, it will be appreciated that, in the event of the imposition of a shock force, the camming means is automatically actuated to effect closing of the gap, thereby generating equal resistive forces in opposite directions.

Based on the foregoing, it is believed that the construction, operation, objects and advantages of my present invention will be readily comprehended by persons skilled in the art, without further description. It is to be clearly understood, however, that various changes in the construction described above and illustrated in the drawing may be made without departing from the scope of the invention, it being intended that all matter contained in the description or shown in the drawing shall be interpreted as illustrative only and not in a limiting sense.

I claim:

1. An arrestor for protecting equipment, such as piping, against shock loading, undesirable vibratory movement or the like, comprising:
    a. support means adapted to be secured to a stationary structure;
    b. a spring unit carried by the support means and including
        1. spring means engaging the support means and defining a central through opening;
    c. a rigid member extending through said opening and slidable relative to the spring unit;
    d. a lever connected to and pivotally movable relative to the support means about a first axis and connected to and pivotally movable relative to the rigid member about a second axis;
    e. coupling means connected to and pivotally movable relative to the lever about a third axis and adapted to be connected to the piping; and
    f. camming means including
        1. a first cam member carried by and movable with the lever about said first axis;
        2. a second cam member associated with the first cam member and the spring unit; and
        3. connector means joining the second cam member to the lever.

2. An arrestor according to claim 1 wherein:
    a. the support means comprises a housing including
        1. a partition extending across a portion of the interior thereof and having a through opening; and
    b. the spring unit also includes a tubular member extending through said partition opening and said central through opening.

3. An arrestor according to claim 2 wherein the rigid member extends through the tubular member and is provided with means for varying its effective length.

4. An arrestor according to claim 1 wherein the spring means comprises a plurality of disc springs.

5. An arrestor according to claim 2 wherein the spring means comprises
    a. a compression spring positioned between the partition and one end of the tubular member; and
    b. a compression spring positioned between the partition and the other end of the tubular member.

6. An arrestor according to claim 5 wherein at least one of the compression springs is a disc spring.

7. An arrestor according to claim 1 wherein the second cam member is positioned between the first cam member and the spring unit.

8. An arrestor according to claim 1 wherein the connector means comprises a linkage.

9. An arrestor according to claim 8 wherein the linkage is pivotal relative to the lever about a fourth axis and pivotal relative to the second cam member about a fifth axis.

10. An arrestor according to claim 9 wherein said first, second, third, fourth and fifth axes are spaced apart and parallel.

* * * * *